Jan. 8, 1963   R. E. MIDDLETON   3,072,132
LENS SOAKING KIT
Filed Feb. 1, 1960

INVENTOR.
ROBERT E. MIDDLETON
BY
*Philip H. Sheridan*
ATTORNEY

United States Patent Office 3,072,132
Patented Jan. 8, 1963

3,072,132
LENS SOAKING KIT
Robert E. Middleton, 5374 E. Utah Place, Denver, Colo.
Filed Feb. 1, 1960, Ser. No. 6,019
3 Claims. (Cl. 134—137)

This invention relates to a new and useful receptacle adaptable for use in the cleansing and storage of small objects, such as contact lens, and more particularly relates to a lens soaking kit in the form of a liquid filled container which is characterized by an improved arrangement for the hydrated storage and cleansing of lenses placed therein.

The kit of the present invention is especially designed as an accessory item for contact lenses which essentially forms a convenient storage and cleansing receptacle for a pair or number of pairs of contact lenses. Articles such as contact lenses require periodic cleaning and due to the size and delicateness of the lenses, it is highly desirable to provide a compact kit which occupies a minimum of space and can be easily carried on the person of the wearer. Moreover, it is customary to carry an extra pair of lenses in the event of loss or breakage, and accordingly the kit of the present invention is adapted for storage of two pair wherein additional compartments are provided for periodically cleaning the pair being worn in a safe and dependable way and so that there is no danger of mixing up or confusing the respective pairs of lenses for each eye.

Accordingly, it is a principal object of the present invention to produce a compact, efficient storage and cleansing receptacle specifically adapted for contact lenses which is characterized by enabling ease of insertion and removal of the lenses for effective cleansing and storage thereof.

It is another object to provide for a contact lens kit which is simplified in construction and design, employing a minimum number of parts and which enables insertion of lenses therein both for wet storage and for periodic cleaning; and, in the event of the latter, enables the safe and dependable insertion and removal of each lens into and from the container without loss or spillage of a soaking solution therein.

It is a further object to provide for a soaking kit which is adapted for use in the cleansing and storage of one or more pairs of lenses and in such a way as to enable accurate identification of the lenses with a minimum of handling, and to avoid damaging or scratching the lenses.

It is still a further object of the present invention to provide for a contact lens soaking kit divisible into pairs of inner liquid containing storage compartments and outer displaceable compartments communicating with the inner compartments to support lenses for hydrated storage and washing thereof.

The above and other objects and advantages of the present invention will become more apparent from the following detailed description taken together with the accompanying drawings, in which.

Figure 1:
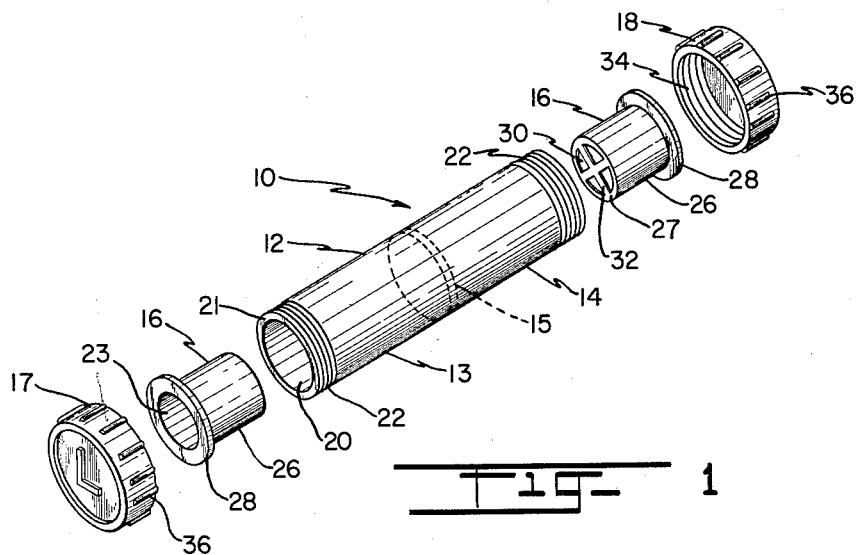
FIGURE 1 is an enlarged exploded, perspective view of a preferred embodiment of the lens soaking kit.
Figure 3:
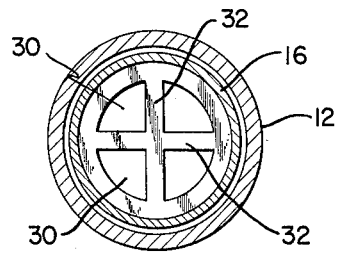
FIGURE 3 is an enlarged cross-sectional view taken on line 3—3 of FIGURE 2.
Figure 2:
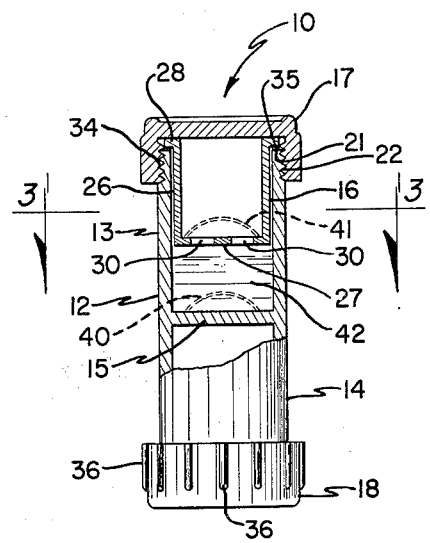
FIGURE 2 is an enlarged longitudinal view partially in section of the preferred form of soaking kit.

Referring more particularly to the drawings, there is shown by way of illustrative example a preferred form of lens soaking kit 10 which is essentially comprised of a container defined by a generally tubular member 12 divided into a pair of open ended compartments 13 and 14 by a central partition 15, removable baskets 16 and detachable end caps 17 and 18. In accordance with the present invention, provision is made for a recessed basket member, such as one or both of the members 16, which is formed for insertion into a lens storage container, as defined by the tubular member 12, partially filled with liquid and wherein the basket portion is constructed for disposition in sealed relation therein such as by means of one or both of the end caps 17 or 18, to support or hold a lens therein for selective washing by the liquid, and thereafter following the washing operation, the basket and lens are removable from the container without displacement or withdrawal of the cleansing liquid. With a construction and arrangement such as essentially described, a lens or pair of lenses may be cleansed or stored in the container with a minimum of handling so as to avoid damaging or dropping of the lens.

In its preferred form, the generally tubular member 12 is in the form of a hollow cylindrical portion and the divider 15 is defined by a solid circular disc which is permanently disposed across the middle of the container to separate it into the two separate sides 13 and 14. It will be evident that the purpose of employing the divider 15 to separate the sleeve into two separate compartments is in order to accommodate for example, the lens for the left eye on one side 13 of the sleeve and the lens for the right eye on the opposite side 14 of the sleeve so as to avoid any possible confusion in storing or cleansing the respective lenses. In this connection, the end caps 17 and 18 may be suitably labeled for example by lettering the cap 17 with "L" to indicate the left eye lens or lenses, and the end cap 18 being labeled with an "R," not shown, to indicate the compartment for the right eye lenses. Since each side of the container corresponds identically in construction and arrangement, the principal features of the present invention will be described by reference to one side only, it being understood that in actual use a lens kit may be formed incorporating a container in the form of one side only of the container of the present invention although of course it is greatly preferred to form the container of two separate compartments 13 and 14.

Now referring to the compartment 13, open end 20 has a peripheral edge portion 21 together with exterior threading 22 adjacent the open end to permit threaded connection of the end cap 17 thereto. A primary feature of the present invention is the construction and arrangement of the basket portion 16 in relation to the compartment 13 and end cap 17. Essentially, the basket 16 functions as an outer lens receiving chamber removably positioned in the open end 23 and communicating with the interior of the compartment 13 to permit entry of a soaking solution for the lens. In this connection, reference to the "inner chamber" is intended to indicate the area formed adjacent to the divider 15 when the basket is disposed in the open end, and "outer chamber" to indicate the area formed by the basket itself when positioned in the compartment 13 or 14. The basket portion 16 is broadly comprised of a sidewall 26 preferably in the form of a cylindrical sleeve, a bottom recessed support portion 27 and a top external lip or shoulder 28 flaring from the sidewall 26 at its upper end. In relation to the side 13 the sidewall portion 26 is sized for insertion into the compartment in inner concentric relation and is of a relatively shallow depth such that the bottom support portion 27 extends approximately half way into the compartment and with the shoulder 28 resting on the peripheral edge 21 thereof. The bottom support portion is provided with openings, such as restricted openings 30, which are of limited area as determined by intersecting portions 32 so that liquid is free to enter the basket portion while the bottom 27 including the intersecting portions 32 operates to support the lens against dropping into the inner compartment.

The end cap 17 may be of any conventional form so as to firmly hold the basket portion 16 in place and to seal the container as a whole against accidental loss of liquid therefrom. Preferably the end cap 17 is of inverted cup-shaped form with the sides thereof being interiorally threaded as at 34 for threaded connection to the exterior threaded surface 22 of the compartment and further includes a gasket 35 if desired to insure sealed relation between the parts. In connected relation the top of the cap 17 will firmly engage the shoulder 28 of the basket to hold it in place against the peripheral edge 21 and prevent any relative shifting between the basket and compartment 13. If desired, outer projections 36 may also be provided on the side of the end caps for ease of gripping and threading into place over the open ends of the container.

To illustrate the compact construction of the soaking kit of the present invention, the tubular member 12 is sized on the order of a lipstick tube so as to permit easy carrying in the purse or pocket and its length is determined only by that amount of space necessary to provide inner storage chambers for convenient and more permanent storage of an extra pair of lenses 40 on each side of the divider 15 together with the added space adjacent the open end for insertion of the basket portion 16 which is in turn necessarily only of a length and size to accommodate contact lenses 41 therein, the latter customarily being the set which is normally worn and which requires periodic storage and cleaning.

When desired, the baskets 16 are useful for storage of the lenses normally worn, and a pair of lenses 40 may also be stored in the inner chambers. A soaking or cleansing solution 42 is then poured into the compartments to prevent the lenses from shifting and bouncing in the kit and to cleanse them so that they are available for immediate use. A number of soaking or wetting solutions are commercially available and when used in conjunction with the soaking kit 10 may be poured into each compartment 13 and 14 preferably filling each side of the kit at least three-fourths full, although an amount may be used only to insure complete wetting when the kit is tipped or shaken to circulate the liquid completely over the lenses. In the usual soaking procedure the solution is employed to thoroughly wet the lenses and prior to replacement of each lens in the eye, a wetting or cleaning solution should be used on the lens to prevent any possible irritation, or distortion of vision.

In order to clean the lenses 41, the baskets 16 are especially effective in providing a means of handling the lenses during the cleansing operation. Thus, when it is desired to clean each lens, it may merely be placed in the appropriate basket on either side of the container following which the cap may be placed into sealed relation over the end to hold the basket firmly in place; then by gentle shaking or tipping of the container the liquid will be caused to flow into and through the openings 30 and over the lens to thoroughly wet it. To remove the lens, the cap is first removed and merely by inserting for example the little finger into the interior of the basket, the basket may be easily displaced from the compartment at which time the liquid will drain downwardly through the openings 30 into the inner storage compartment. The lens is then left in the basket and thoroughly rinsed and in this way handling of the lens is completely avoided throughout the cleansing operation. Once dried, the basket may merely be inverted to remove the lens therefrom for placement in the eye. The baskets 16 also form a further useful function in removal of the innermost lens 40 in that once the liquid is drained out of the container the lens may be dropped into the basket for rinsing, and as before, placement in the eye.

Preferably rigid materials are employed throughout in the construction of the kit and for example a number of plastic materials are commercially available which lend themselves very well to a construction of this type in that there is no danger of scratching or marring the surface of the lenses. A number of modifications may be adopted especially in the configuration and relative shape of the various elements forming the soaking kit of the present invention. For example, the elements need not necessarily be cylindrical but can be rectangular or of any practical shape and as mentioned either one or two compartments may be employed, although again it is of great advantage to provide a pair of compartments to house respective lenses for each eye. Furthermore, limited communication may be established through the central partition 15 separating the compartments which would only serve the advantage of permitting complete drainage from either compartment when it is desired to remove a lens 40 for example therefrom without loss of any liquid. On the other hand, it is just as desirable to retain liquid at all times in each of the compartments no matter what position the kit is in when lenses are being stored in the inner compartmental portions. In addition, although not shown, the inner end surfaces of the caps 17, and also the opposed surfaces of the central partition 15 are preferably roughened or provided with some slight projections to prevent the lenses from sticking to the surfaces.

It is to be understood that various other modifications and changes may be made in the construction and arrangement of the present invention together with the composition of materials employed therein without departing from the scope of the present invention as defined by the appended claims.

What is claimed is:

1. A contact lens soaking kit comprising a generally tubular member having a central partition dividing said tubular member into a pair of opposed open-ended compartments, baskets removably positioned in the opposed open ends, each basket including a flared end portion to seat on the open end of each compartment and a partially open bottom lens support portion spaced from the central partition to form communicating inner and outer lens receiving chambers for soaking a pair of lenses therein, and end closure members retaining the flared ends of each basket in seated disposition against the open end of each compartment.

2. A contact lens soaking kit comprising a tubular member having a central partition dividing said member into a pair of open-ended compartments having a common closed end and each adapted to be at least partially filled with a solution, baskets adapted for insertion in inner concentric relation in opposed open ends of said compartments each basket including an external lip at one end to seat on the end of said compartment and a bottom lens support portion including restricted openings therein, the bottom lens support portion being spaced from the central partition to form communicating inner and outer lens receiving chambers for the respective wet storage and cleaning of a pair of lenses therein, and detachable end caps to engagingly retain the lip of each basket in seated disposition against the ends of said compartments.

3. A contact lens cleaning, drying and storage kit adapted to accommodate two pairs of contact lenses in a manner to keep the members of the pairs separated comprising: a tubular member having a central partition dividing said member into a pair of open-ended compartments, the partition serving as a common bottom for said compartments; a cylindrical basket having a bottom with openings therein nested concentrically in either open end of said compartments and extending approximately halfway into the compartment so that each of said compartments is divided into an upper drying section bounded by the internal wall of the basket and its bottom and a lower section bounded by a portion of the internal wall of said compartment, said partition and the outside of said partially open bottom, said basket having an annular flange around its outside end having a diameter substantially equal to that of the outside diameter of the compartment and seated on the open end of said compartment; a removable cap member at either end of said tubular member securely attached thereto and clamping said flange in a fluid tight relationship to the end of said compartment; and a lens cleaning fluid in one of said lower sections substantially filling it; whereby a pair of lenses can be kept in each compartment with one lens of each pair in the lower and upper sections, respectively, of each compartment, and the members of one pair can be simultaneously cleaned and dried.

References Cited in the file of this patent

UNITED STATES PATENTS

| | | |
|---|---|---|
| 554,324 | Unger | Feb. 11, 1896 |
| 2,204,784 | Abrams | June 18, 1940 |
| 2,541,595 | Marshall | Feb. 13, 1951 |
| 2,568,029 | Seemar | Sept. 18, 1951 |

FOREIGN PATENTS

| | | |
|---|---|---|
| 1,164,694 | France | May 19, 1958 |